United States Patent [19]
Beattie

[11] Patent Number: 5,082,299
[45] Date of Patent: Jan. 21, 1992

[54] ADJUSTABLE ROTATIONAL COUPLER

[76] Inventor: James C. Beattie, 6747 Whitestone Rd., Baltimore, Md. 21207

[21] Appl. No.: 611,261

[22] Filed: Nov. 9, 1990

[51] Int. Cl.$^5$ .................... B23B 31/36; F16C 23/06
[52] U.S. Cl. .................... 279/1 L; 82/170; 279/6; 384/258; 384/519; 384/583; 228/6.1; 228/49.1
[58] Field of Search .............. 279/1 L, 6; 82/170; 384/257-259, 519, 583; 228/6.1, 49.1

[56] References Cited

U.S. PATENT DOCUMENTS

| | | | |
|---|---|---|---|
| 1,723,356 | 8/1929 | Knowles | 279/6 |
| 2,524,468 | 10/1950 | Ouimette | 279/6 |
| 2,815,958 | 12/1957 | Minati | 279/1 L |
| 2,984,494 | 5/1961 | Alston | 279/6 |
| 3,962,937 | 6/1976 | Miller | 279/6 X |
| 5,000,366 | 3/1991 | Beattie | 228/6.1 |

Primary Examiner—Steven C. Bishop
Attorney, Agent, or Firm—Cushman, Darby & Cushman

[57] ABSTRACT

An adjustable rotational coupler includes a housing having an interior bore concentric with a central axis of the housing. The housing is mountable to a mounting member. Threaded adjusters can be used to adjust the housing with respect to the mounting member such that an attitude of a plane perpendicular to the central axis of the housing is adjustable with respect to an attitude of a plane perpendicular to a central axis of the mounting member. A rotatable inner race is adjustably disposed in the interior bore of the housing such that a face plate is mountable to the inner race. Threaded adjusters can be used to adjust the inner race with respect to the housing such that a central axis of the face plate is transversely adjustable with respect to the central axis of the housing.

65 Claims, 8 Drawing Sheets

ADJUSTABLE ROTATIONAL COUPLER

BACKGROUND OF THE INVENTION

1. Field of the Invention

The present invention is directed to an adjustable rotational coupling apparatus, and, more particularly, to a coupling apparatus for aligning a mounting plate and axis of a shaft with respect to a specific reference location.

2. Description of the Related Art

Alignment of a shaft mounted mounting plate with respect to a specific reference location is a problem that has been previously recognized. One specific application where this has been a problem involves a machine used to weld two halves of a torque converter together. Such a machine is disclosed in pending U.S. application Ser. No. 07/522,891 filed May 14, 1990, now U.S. Pat. No. 5,000,366, the matter of which is incorporated by reference herein.

As disclosed in FIG. 1, the welding machine 10 includes a fixed shaft 12 and a telescoping shaft 14. A chuck 16 is mounted to the fixed shaft 12 and a face plate 18 is mounted to the telescoping shaft 14. A transmission side cover 20 of the torque converter can be mounted in the chuck 16 and an engine side cover 22 of the torque converter is loosely positioned against the cover 20. The telescoping shaft can then be extended as shown in FIG. 2 to clamp the two covers 20 and 22 of the torque converter together. Cover 22 includes a pilot shaft 23 and a plurality of mounting lugs 25. A central axis of the pilot shaft 23 is the central axis of the cover 22. A pump drive tube 21 attached to the transmission side cover 20 is the central axis of the cover 20 which is accurately located with respect to a central axis of chuck 16. Therefore, the positioning of the central axis of the cover 22 is accomplished by inserting the pilot shaft 23 into a locating bore (not shown) in the face plate 18/shaft 14 assembly as the shaft 14 is telescoped to clamp the two covers 20 and 22 together. The mounting lugs 25 pressingly engage the face of the face plate 18 to position the cover 22 and establish a plane in which the cover 22 rotates. Both shafts 12 and 14 are then rotated together at approximately 1 r.p.m. while the two covers 20 and 22 of the torque converter are welded together.

For the finished torque converter to operate optimally, it is necessary for the two covers 20 and 22 to be accurately aligned with each other before welding. This requires that shaft 14 and face plate 18 be accurately aligned with respect to shaft 12 and chuck 16. For proper alignment, the central axis of the locating bore must be concentric with a central axis of the chuck 16 and a plane in which the face plate 18 rotates must be perpendicular to the central axis of the chuck 16.

The chuck 16 is a conventional "AJUST-TRU" chuck, which can be adjusted so that the central axis of the chuck 16 is concentric with the central axis of the shaft 12. However, in the conventional welding machine 10, the face plate 18 is rigidly attached to the shaft 14. All adjustments to insure the true travel of the moving shaft 14 on the central axis of the chuck 16, the precise centering of the locating bore to be truly concentric with the central axis of the chuck 16 and to gain a true perpendicular plane of the face plate 18 to the central axis of the chuck 16 must be made within the mounting of the shaft 4 in the framework of machine 10. Additionally, accurate machining is necessary to insure the true perpendicular plane of the face plate 18 to the outer diameter of the shaft 14 and true concentricity of the inner diameter of the face plate 18 to the outer diameter of the shaft 14.

Therefore, it is possible for the central axis of the locating bore to not be concentric with the central axis of the chuck 16 and/or for the plane in which the face plate 18 rotates to not be perpendicular to the central axis of the chuck 16. Further, since the shaft 14 rotates, any misalignment of the shaft 14 is magnified by a lever arm effect due to the length of the shaft 14 when it is telescoped to clamp the two torque converter covers 20 and 22 together. Thus, these inaccuracies are introduced into the alignment of the two torque converter covers 20 and 22, resulting in a less than optimal final torque converter assembly.

SUMMARY OF THE PRESENT INVENTION

It is an object of the present invention to provide an adjustable rotational coupler that overcomes the alignment difficulties discussed above.

In order to attain the recited objectives of the invention, one embodiment of the present invention includes a housing having an interior bore concentric with a central axis of the housing. The housing is mountable to a mounting member. Means for adjusting the housing with respect to the mounting member is provided such that an attitude of a plane perpendicular to the central axis of the housing is adjustable with respect to an attitude of a plane perpendicular to a central axis of the mounting member.

Additional means for adjusting the housing with respect to the mounting member are provided such that a central axis of the housing is transversely adjustable with respect to the central axis of the mounting member.

A rotatable inner race is adjustably disposed in the interior of the housing such that a face plate is mountable to the inner race. Means for adjusting the inner race with respect to the housing is provided such that a central axis of the inner race is transversely adjustable with respect to the central axis of the housing. Thus, the coupler can be used to adjust a face plate such that it rotates upon an axis concentric with a reference axis and also that the face plate rotates in a plane perpendicular to the reference axis.

With the foregoing in mind, other objects, features and advantages of the present invention will become more apparent upon consideration of the following description and the appended claims with reference to the accompanying drawings, all of which form part of this specification, wherein like reference numerals designate corresponding parts in the various figures.

DESCRIPTION OF THE PREFERRED EMBODIMENT

Figure 1:
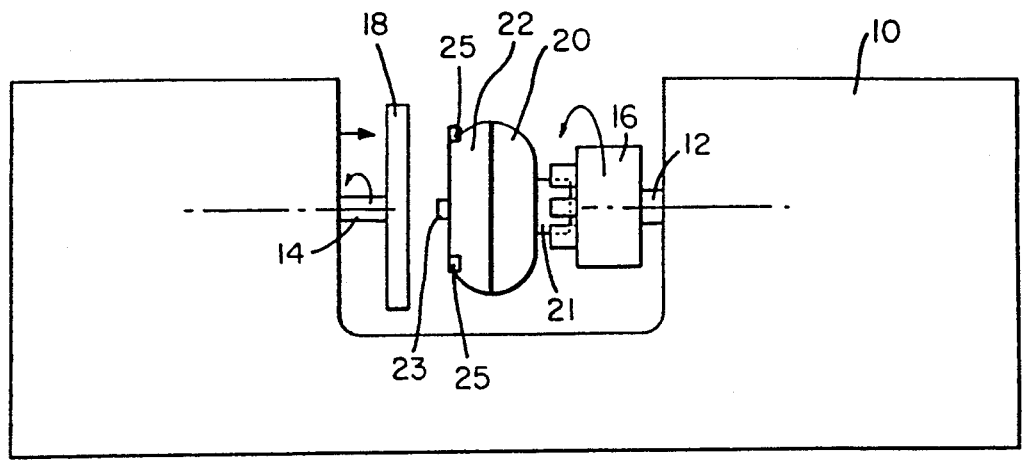
FIG. 1 is a side elevational view of a torque converter welding machine.
Figure 2:
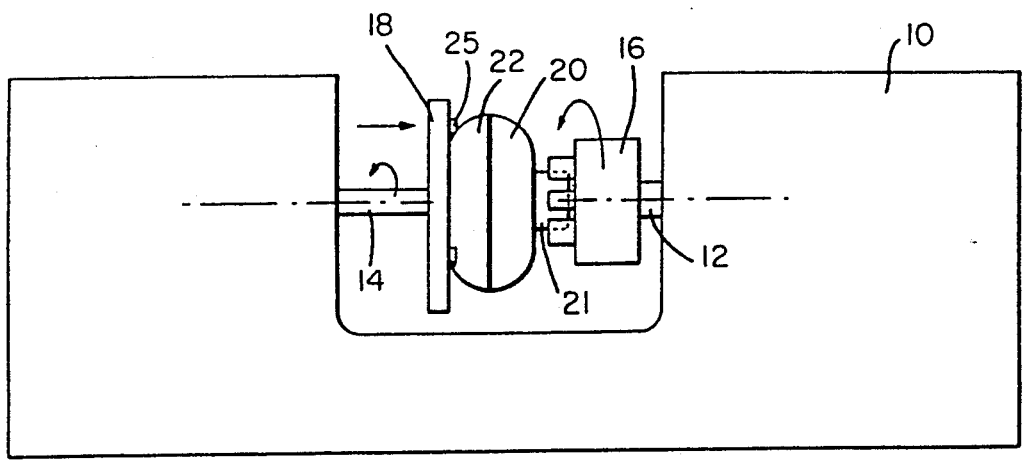
FIG. 2 is a side elevational view of the torque converter welding machine of FIG. 1 with the two torque converter halves clamped together.

As shown in FIGS. 4-7, the adjustable rotational coupler 30 includes a housing 32 having a base 34, an outer wall 36 and an interior bore 38 concentric with a central axis of the housing 30. The base 34 includes a mounting boss 40 for mounting to a mounting member, which can be the telescoping shaft 14 of the torque converter welding machine 10. The coupler 30 can be mounted to the shaft 14 with a bolt 42 passing through a bore 44.

A round locating ring 46 has an outer diameter which is approximately 0.01 cm smaller than the diameter of the bore 38. A tapered roller bearing cup 48 is press fitted into an interior of the locating ring 46 and the resulting assembly is placed in the bottom of the bore 38 where it is free to move within the bounds of the difference between the outside diameter of the locating ring and the diameter of the bore. A tapered roller bearing cone 50 is press fitted onto an outer diameter 52 of an inner race 54 until the bearing 50 abuts a shoulder 56.

In the preferred embodiment, the tapered roller bearing cup 48 is a "TIMKEN" LL217810 cup or its equivalent and the tapered roller bearing cone 50 is a "TIMKEN" LL217849 or its equivalent.

The inner race 54/bearing cone 50 assembly can then be placed into the bore 38 to engage the locating ring 46/bearing cup 48 assembly. A lip 58 of the inner race 54 extends into a counter bore 60 in the base 34 of the housing 32 and sealingly engages an oil seal 62 pressed into the counter bore 60. In the preferred embodiment, the oil seal 62 is a number CR 34840 or its equivalent.

The inner race 54 is retained in the housing 32 by a gland nut 64. The gland nut 64 includes an outer threaded portion 66 which engages with an inner threaded portion 67 of the housing 32 to attach the gland nut 64 to the housing 32. An 0-ring 68 placed in a groove 70 in the housing sealingly contacts an outer surface of the gland nut 64 to seal the gland nut 64 with respect to the housing 32. In the preferred embodiment, the 0-ring is a number 2-49 or its equivalent.

The gland nut 64 has a bore 72 through which a face plate attachment portion 74 of the inner race 54 passes. A thrust bearing 76 and two bearing races 78 are disposed between the shoulder 56 of the inner race 54 and the gland nut 64. In the preferred embodiment, the thrust bearing 76 is a "TORRINGTON" NTA-5266 bearing or its equivalent and the two races are "TORRINGTON" TRA-5266 races or their equivalents. To reduce the thickness of the coupler assembly, the thrust bearing 76 and bearing races 78 are positioned in a recess 80 of the gland nut 64. An oil seal 82 positioned in a groove 84 of the gland nut 64 sealingly contacts an outer surface 75 of the inner race 54 to seal the gland nut 64 with respect to the inner race 54. In the preferred embodiment, the oil seal 82 is a number CR 32325 or its equivalent.

Two threaded oil fill holes 86 are provided in the gland nut for filling the coupler 30 with lubricant after the assembly. In the preferred embodiment, a 90 weight gear oil is used as the lubricant. The oil fill holes are sealed with self-sealing screws 88 after the coupler has been filled with oil. In the preferred embodiment, "UNISEAL" pan head self-sealing screws part No. NT345 S0832 or their equivalents are used. Two blind bores 97 are provided in the gland nut 64 for use with a spanner wrench to tighten the gland nut with respect to the housing 32. A snap ring 90 seated in a groove 92 in an inner bore 89 of the inner race 54 provides a shoulder against which a shaft bushing 85 can be seated. Access bore 93 in the face plate has a larger diameter than the diameter of the inner bore 89 and provides access for inserting the shaft bushing 85. The shaft bushing 85 supports the pilot shaft 23 on the converter cover 22 to translationally locate the central axis of the converter cover 22 with respect to the central axis of the converter cover 20 and chuck 16. Variously sized shaft bushings 85 are used to accommodate differently sized pilot shafts on various torque converters.

Four threaded bores 94 are provided in the inner race 54 for mounting the face plate 18 with four bolts (not shown). Since the inner race 54 is rotationally supported by the bearing 50 in the housing 32, the face plate 18 and inner race 54 can rotate even though the housing 32 is fixedly attached to the mounting member.

The coupler 30 is adjustable in three ways. First, the coupler is adjustable such that an attitude of a plane perpendicular to the central axis of the housing 32 is adjustable with respect to an attitude of a plane perpendicular to a central axis of the shaft 14. To accomplish this, four threaded bores 98 are provided in the base 34 of the housing 32 circumferentially parallel to the central axis of the housing and surrounding the boss 40. An adjusting screw 100 is disposed in each threaded bore 98 and is accessible for adjustment purposes through access bores 102 and 104 in the inner race 54 and face plate 18, respectively. In the preferred embodiment, each adjusting screw 100 is a 5/16-24-⅜" long allen head set screw.

Figure 9:
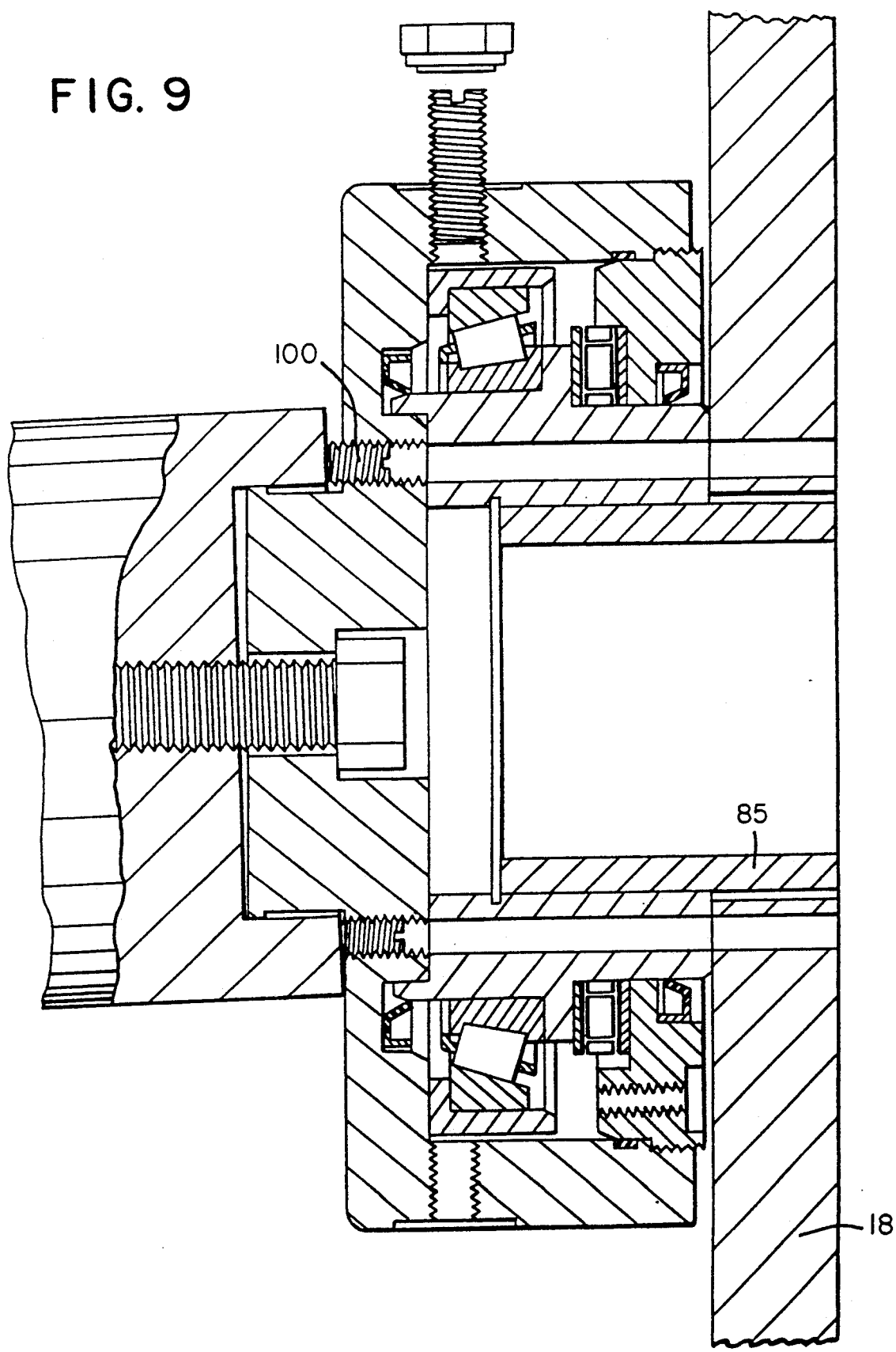
FIG. 9 is a sectional side view of the adjustable rotational coupler showing adjustment of the housing with respect to the shaft.

Each adjusting screw 100 can be adjusted to contact an end face 110 of the shaft 14 and displace the housing 32 away from the shaft 14. A recess 106 is provided on the boss 40 to provide clearance between the boss 40 and the receiving recess 108 in the shaft 14 as adjustment of the adjusting screws 100 causes the housing 32 to tilt with respect to the shaft 14. The adjusting screws 100 thus provide the means by which the attitude of the plane perpendicular to the central axis of the housing 32 can be adjusted with respect to the attitude of the plane perpendicular to the central axis of the shaft 14. This can best be seen in FIG. 9 where the upper adjusting screw 100 in the figure has been adjusted to displace the coupler 32.

The coupler 30 is also adjustable such that a central axis of the inner race 54 can be adjusted transversely with respect to the central axis of the housing 32. Eight threaded bores 112 are provided in the outer wall 36 of the housing 32 circumferentially perpendicular to the central axis of the housing. An adjusting screw 114 is disposed in each threaded bore 112 and can be locked in place with a lock nut 116 screwed onto the adjusting screw 114 and against a spot faced recess 118 surrounding each bore 112. In the preferred embodiment, each adjusting screw 114 is a 5/16-24-7/8" long allen head set screw or its equivalent and each lock nut 116 is an "ABBOT HYDRA-LOK" 5/16-24 hex nut or its equivalent. This type of nut has sealing capabilities such that when it is tightened against the spot face 118, it effectively seals the housing 32 from leaking at the threaded bore 112.

Figure 8:
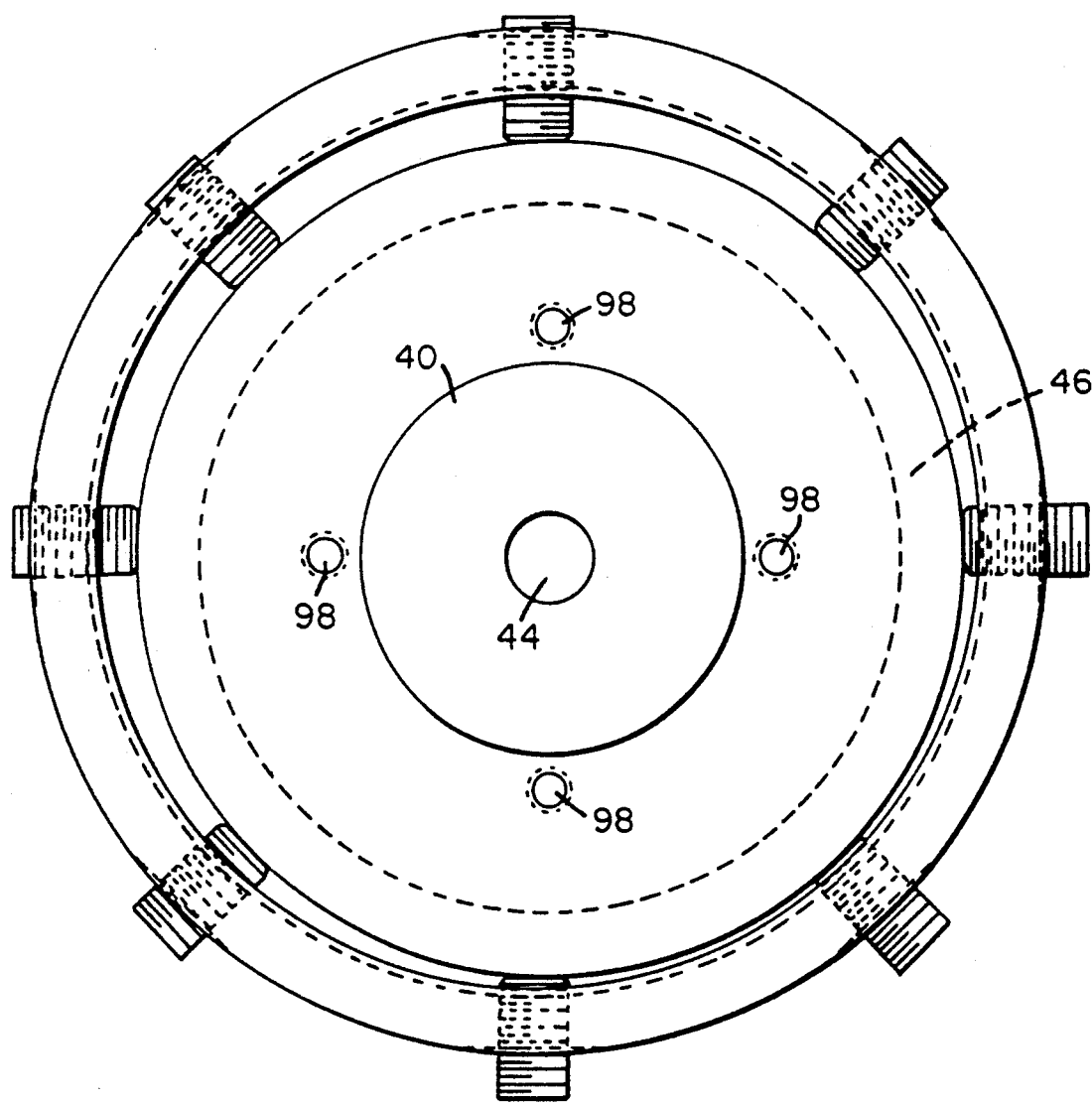
FIG. 8 is a rear view of the adjustable rotational coupler showing adjustment of the locating ring with respect to the housing.

Each adjusting screw 114 can be adjusted to contact an outer surface of the locating ring 46. By adjusting each of the adjusting screws in a complementary manner, the central axis of the locating ring 46 and hence, of the bearing cup 48, bearing cone 50, and inner race 54 can be transversely adjusted with respect to the central axis of the housing 32. This adjustment can best be seen in FIG. 8 where the central axis of the locating ring 46 has been adjusted downward in the figure with respect to the central axis of the housing 32. Enough clearance is provided between all of the internal components of the coupler such that a full range of adjustment of the mounting pate central axis is limited only by the clearance between the outer diameter of the locating ring 46 and the diameter of the bore 38 and the range of sealing of the oil seals 62 and 82. Each of the oil seals 62 and 82 are compliant enough to maintain their seals against the inner race 54 as the axis of the inner race 54 is adjusted within the given range. In an alternative embodiment, end face 0-rings can be used in place of the oil seals to further increase the adjustable range of the coupler 30 and that the size and adjustable range of the various components can be varied as necessary for different applications.

Figure 10:
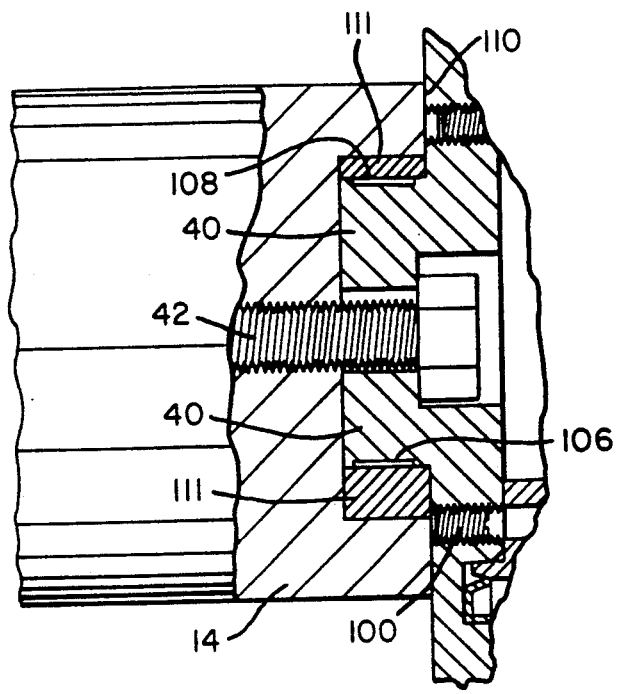
FIG. 10 is a partial sectional side view of an alternative embodiment of the adjustable rotational coupler.
Figure 11:
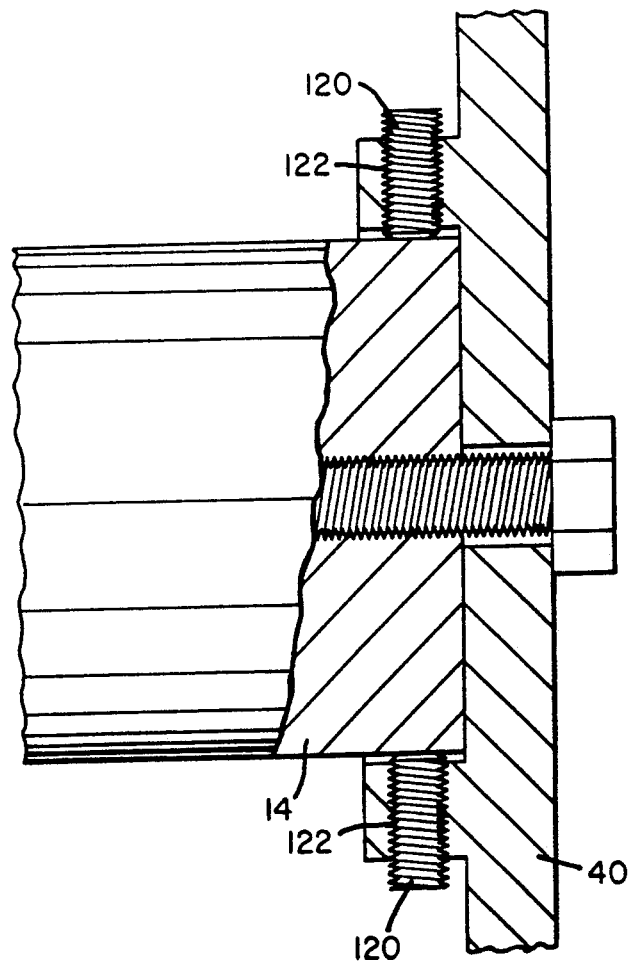
FIG. 11 is a partial sectional side view of an alternative embodiment of the adjustable rotational coupler.

It is desirable to mount the housing 32 to the mounting member so that the inner bore 38 of the housing 32 is approximately concentric with a reference axis before making final accurate adjustments of the inner race 54 to enhance seal life. Alternate methods are particularly desirable if the central axis of the shaft 14 and the reference axis are not concentric by a relatively large distance. As shown in FIG. 10, a bushing 111 with an offset internal bore can be placed in the bore 108 of the shaft 14 and the boss 40 turned down to fit in the internal bore of the offset bushing, thereby offsetting the coupler 30 with respect to the central axis of the shaft 14. Or, as shown in FIG. 11, an alternative embodiment of the coupler 30 uses a plurality of adjusting screws 120 perpendicular circumferentially placed in a plurality of threaded bores 122 in the boss 40 to adjust against the outer diameter of the shaft 14 to offset the coupler 32 with respect to the central axis of the shaft 14.

Figure 3:
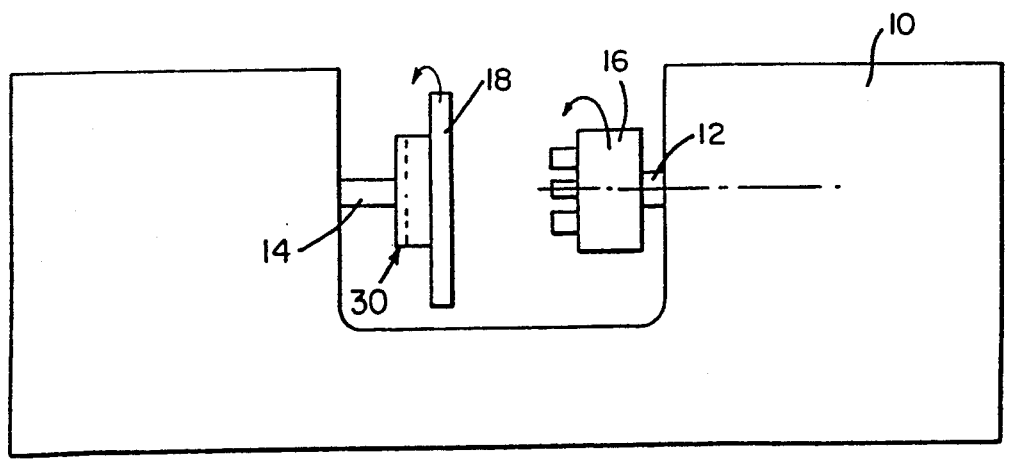
FIG. 3 is a side elevational view of the torque converter welding machine of FIG. 1 with the adjustable rotational coupler of the present invention installed.
Figure 4:
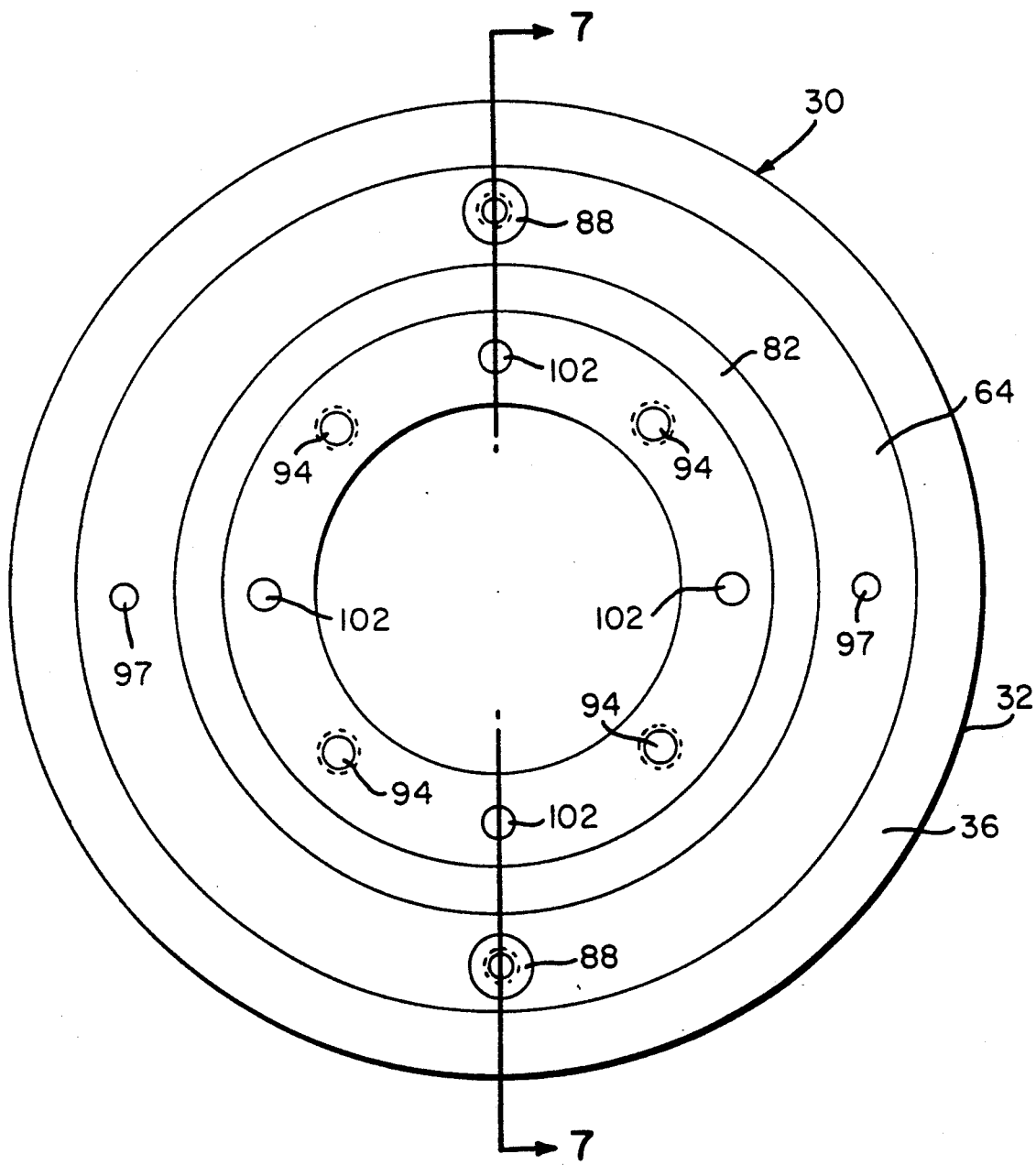
FIG. 4 is a front view of the adjustable rotational coupler.
Figure 5:
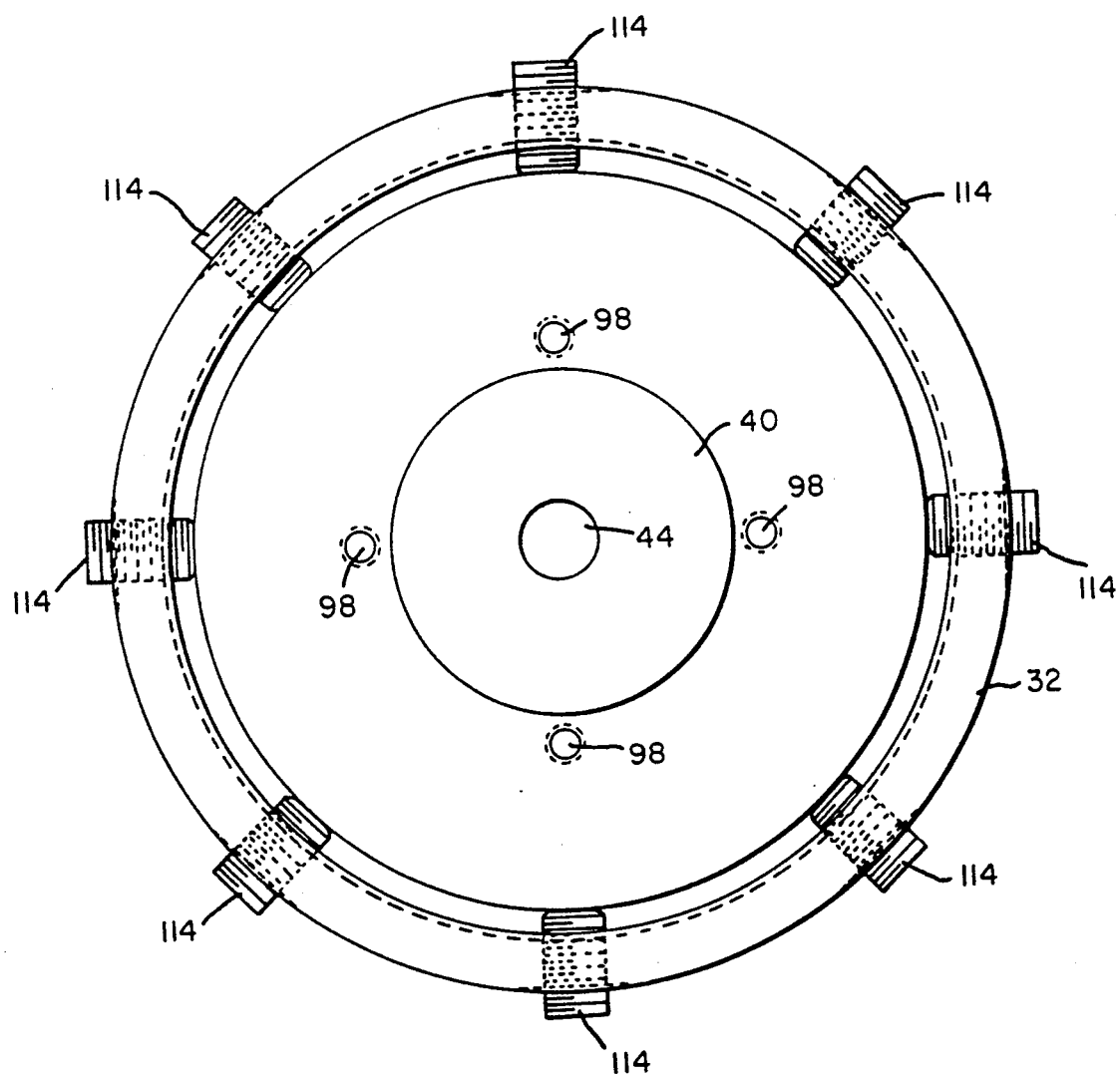
FIG. 5 is a rear view of the adjustable rotational coupler.
Figure 6:
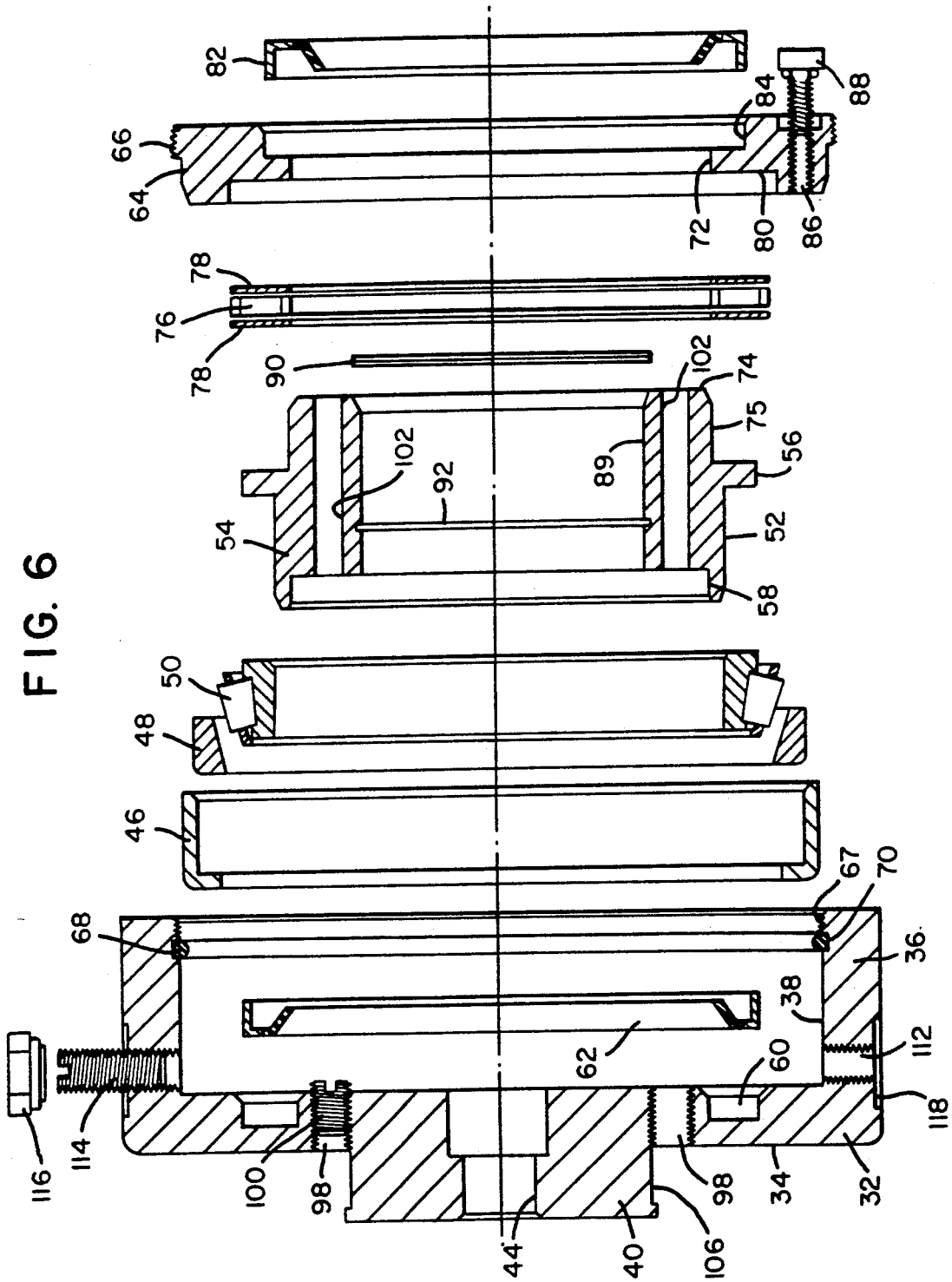
FIG. 6 is an exploded side view of the adjustable rotational coupler.
Figure 7:
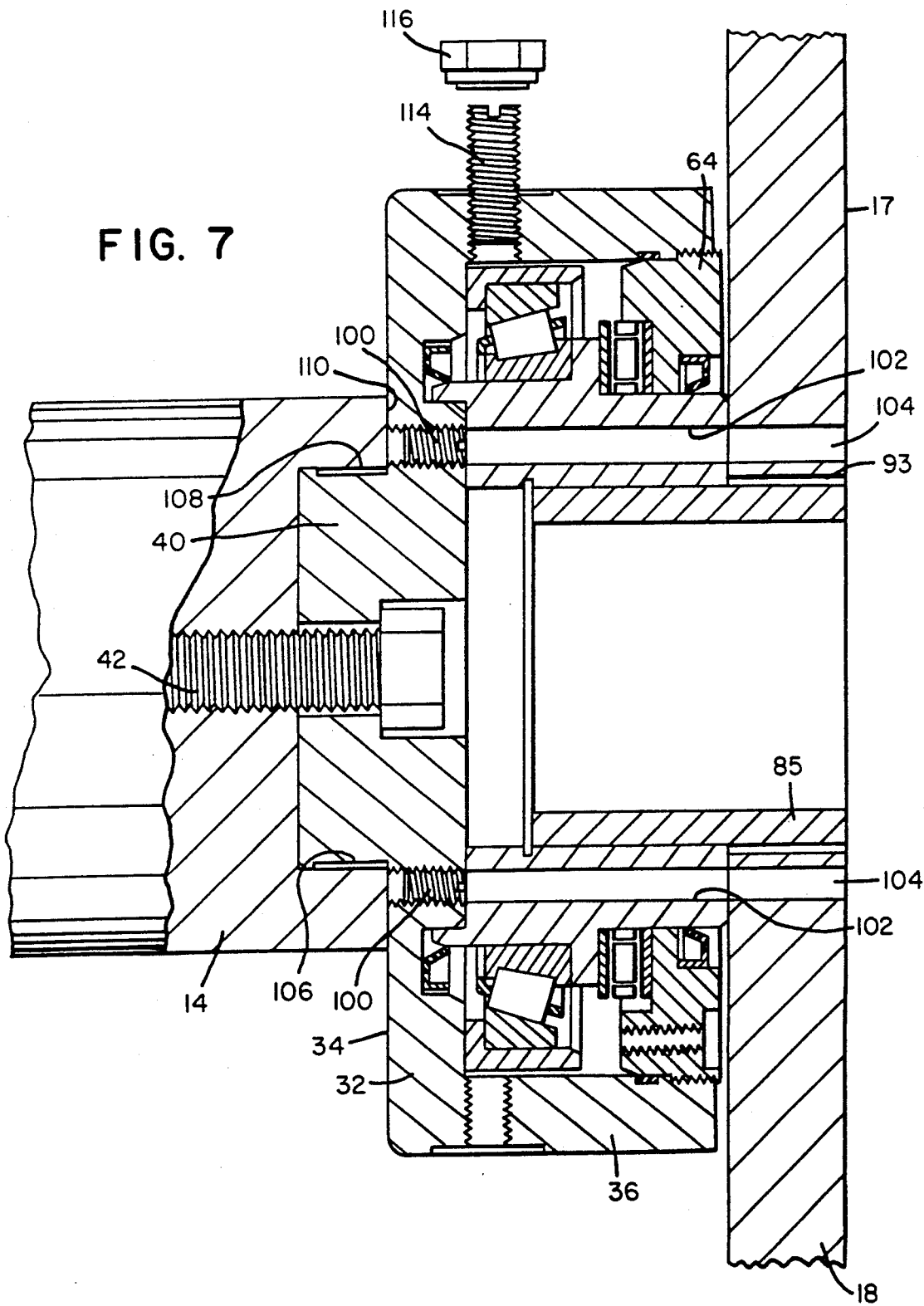
FIG. 7 is a sectional side view of the adjustable rotational coupler taken along line 7—7 in FIG. 4.

In one specific application, the adjustable rotational coupler is used in conjunction with the torque converter welding machine 10 discussed above. As seen in FIG. 3, the coupler 30 is attached between the shaft 14 and the face plate 18. The housing 32 is bolted to the shaft 14 and the inner race 54 is bolted to the face plate 18. Since the inner race 54 and thus, the face plate 18 can rotate relative to the housing 32 and thus, the shaft 14, it is not necessary for the shaft 14 to rotate. The welding machine can be modified so that shaft 14 only telescopes and does not rotate. This increases the accuracy of the positioning of the inner race 54 and face plate 18 since any errors in the alignment of the shaft 14 are not magnified by a lever arm effect induced by rotation of the shaft.

To set up the welding machine 10, the chuck 16 is first adjusted such that the central axis of the chuck 16 is concentric with the central axis of the shaft 12. The central axis of the chuck 16 then becomes the reference axis and the plane in which the chuck 16 rotates becomes the reference plane.

Next, the shaft 14 is adjusted such that a central axis of the shaft 14 is parallel with the reference axis as nearly as possible. To do this, the shaft 14 is first extended approximately 20 cm. Then two indicators are attached to the chuck 16 to read against the shaft at approximately 2.5 cm and 18 cm from the shaft coupler mounting end, respectively. This gives comparative measurements which can be used to adjust the central axis of the shaft 14 with respect to the reference axis such that the central axis of the shaft 14 is parallel to the reference axis. It is necessary that the shaft 14 travels along an axis parallel to the reference axis to provide maximum alignment accuracy of the two torque converter halves.

After the shaft 14 is adjusted such that its central axis is as nearly parallel to the reference axis as possible, it is then determined by the indicators how far off concentricity the central axis of the shaft 14 is with respect to the reference axis. A rough adjustment of the central axis of the coupler 30 so that it is concentric with the reference axis can be accomplished by machining the outer diameter of the boss 40 down slightly so that it can be translationally shifted in the recess 108 of the shaft 14. For instance, if the central axis of the shaft 14 is 0.01 cm total indicated readout from being concentric with the reference axis, 0.01 cm can be machined off of the outer diameter of the boss 40. The coupler 30 is attached to the shaft 14 and the bolt 42 is finger tightened. The coupler 30 is then shifted 0.01 cm in the appropriate direction. This is determined by indicating from the outer diameter of the housing 32 with the indicator attached to the chuck 16. The bolt 42 is then tightened to approximately 25 ft-lbs.

Next, the face plate 18 is attached to the inner race 54 of the coupler 30 and the coupler 30 is adjusted with adjusting screws 100 such that the plane normal to the central axis of the face plate 18 is perpendicular to the reference axis. Adjusting screws 100 are adjusted through access bores 102 and 104 until an indicator attached to the chuck 16 and reading against a surface 17 of the face plate 18 near the outer diameter of the face plate 18 indicates that the plane perpendicular to the central axis of the face plate 18 is perpendicular to the reference axis. Finally, the bolt 42 is tightened to approximately 80 ft-lbs. This provides a planar surface 17 of the face plate 18 against which lugs 25 of cover 22 can pressingly engage to position the cover 22 in the desired rotational plane.

Then, as the final step in the adjustment of the coupler 30, the adjustment screws 114 are adjusted to transversely displace the central axis of the inner race 54 until it is concentric with the reference axis. Again, this is determined through an indicator attached to the chuck 16 which reads against the inner bore 89 of the inner race 54. At this point, the lock nuts 116 can be tightened and bushing 85 inserted into bore 89. The face plate 18, inner race 54 and bushing 85 will now be running true to the chuck 16, thereby providing greater accuracy in the welding of the two torque converter halves 20 and 22. The present invention thus allows the welding machine to be finally set up so that the face plate 18 is within 0.0002 cm of being perpendicular to the reference axis and the inner race 54 is within 0.0002 cm of being concentric with the reference axis, each being independently adjustable of one another. Once the welding machine 10 is initially set up as thus described, it will not be necessary to readjust the coupler 30 until the machine wears and/or is damaged.

Although the coupler 30 has been described above with reference to a torque converter welding machine, it should be realized that the coupler 30 can be used with other types of machines. Nor does the housing 32 need to be attached to a shaft but can be attached to any type of corresponding mounting member. The number and size of adjustment screws can be varied for different applications, as well as the size and handling capabilities of the coupler 30 itself. The coupler 30 can be constructed in any desired size and capability and with any desired range of adjustment, both internally in its displacement of the inner race 54 and externally in its method of attachment to the mounting member and initial adjustment by the mounting method, depending only on the application.

While the invention has been described in accordance with what is presently conceived to be the most practical and preferred embodiment, it is to be understood that the invention is not to be limited to the disclosed embodiment but on the contrary, is intended to cover various modifications and equivalent arrangements included within the spirit and the scope of the appended claims, which scope is to be accorded the broadest interpretation of such claims so as to encompass all such equivalent structures.

I claim:

1. An adjustable rotational coupler comprising:
   a housing having an interior bore concentric with a central axis of the housing, the housing mountable to a mounting member;
   means for adjusting the housing with respect to the mounting member such that an attitude of a plane perpendicular to the central axis of the housing is adjustable with respect to an attitude of a plane perpendicular to a central axis of the mounting member;
   a rotatable inner race adjustably disposed in the interior bore of the housing such that a face plate is mountable to the inner race; and
   means for adjusting the inner race with respect to the housing such that a central axis of the inner race is transversely adjustable with respect to the central axis of the housing.

2. An adjustable rotational coupler as in claim 1, wherein the means for adjusting the housing with respect to the mounting member comprises:
   a plurality of threaded bores disposed in a base of the housing circumferentially parallel to the central axis of the housing; and
   a plurality of threaded planar adjusters engaging the threaded bores, respectively, whereby the threaded adjusters can be rotated to engage an end face of the mounting member to thereby displace the housing with respect to the mounting member.

3. An adjustable rotational coupler as in claim 1, wherein the means for adjusting the inner race with respect to the housing comprises:
   a plurality of threaded bores disposed in an outer wall of the housing circumferentially perpendicular to the central axis of the housing; and
   a plurality of threaded axial adjusters engaging the threaded bores, respectively, whereby the threaded adjusters can be rotated to displace the inner race and the central axis of the inner race with respect to the housing.

4. An adjustable rotational coupler as in claim 1, further comprising:
   bearing means disposed between the inner race and the means for adjusting the inner race for rotationally supporting the inner race with respect to the housing.

5. An adjustable rotational coupler as in claim 4, wherein the bearing means comprises a tapered roller bearing.

6. An adjustable rotational coupler as in claim 4, further comprising:
   a locating ring mounted between the bearing means and the means for adjusting the inner race, the bearing means being inserted into the locating ring and the means for adjusting the inner race engaging an outer surface of the locating ring.

7. An adjustable rotational coupler as in claim 1, further comprising:
   a gland nut engageable with the housing and the inner race to prevent lateral displacement of the inner race with respect to the housing.

8. An adjustable rotational coupler as in claim 7, further comprising:
   bearing means disposed between the inner race and the gland nut for rotationally supporting the inner race with respect to the gland nut.

9. An adjustable rotational coupler as in claim 8, wherein the bearing means comprises a thrust bearing.

10. An adjustable rotational coupler as in claim 1, further comprising:
    sealing means for sealing the coupler to retain a lubricant in the interior of the coupler.

11. An adjustable rotational coupler comprising:
    a housing having an interior bore concentric with a central axis of the housing, the housing mountable to a mounting member;
    means for adjusting the housing with respect to the mounting member such that an attitude of a plane perpendicular to the central axis of the housing is adjustable with respect to an attitude of a plane perpendicular to a central axis of the mounting member; and
    a rotatable inner race adjustably disposed in the interior bore of the housing such that a face plate is mountable to the inner race.

12. An adjustable rotational coupler as in claim 11, wherein the means for adjusting the housing with respect to the mounting member comprises:
    a plurality of threaded bores disposed in a base of the housing circumferentially parallel to the central axis of the housing; and
    a plurality of threaded planar adjusters engaging the threaded bores, respectively, whereby the threaded adjusters can be rotated to engage an end face of the mounting member to thereby displace the housing with respect to the mounting member.

13. An adjustable rotational coupler as in claim 11, further comprising:
    bearing means disposed between the inner race and the housing for rotationally supporting the inner race with respect to the housing.

14. An adjustable rotational coupler as in claim 13, wherein the bearing means comprises a tapered roller bearing.

15. An adjustable rotational coupler as in claim 11, further comprising:
a gland nut engageable with the housing and the inner race to prevent lateral displacement of the inner race with respect to the housing.

16. An adjustable rotational coupler as in claim 15, further comprising:
bearing means disposed between the inner race and the gland nut for rotationally supporting the inner race with respect to the gland nut.

17. An adjustable rotational coupler as in claim 16, wherein the bearing means comprises a thrust bearing.

18. An adjustable rotational coupler as in claim 11, further comprising:
sealing means for sealing the coupler to retain a lubricant in the interior of the coupler.

19. An adjustable rotational coupler comprising:
a housing having an interior bore concentric with a central axis of the housing, the housing mountable to a mounting member;
a rotatable inner race adjustably disposed in the interior bore of the housing such that a face plate is mountable to the inner race; and
means for adjusting the inner race with respect to the housing such that a central axis of the inner race is transversely adjustable with respect to the central axis of the housing.

20. An adjustable rotational coupler as in claim 19, wherein the means for adjusting the inner race with respect to the housing comprises:
a plurality of threaded bores disposed in an outer wall of the housing circumferentially perpendicular to the central axis of the housing; and
a plurality of threaded axial adjusters engaging the threaded bores, respectively, whereby the threaded adjusters can be rotated to displace the inner race and the central axis of the inner race with respect to the housing.

21. An adjustable rotational coupler as in claim 19, further comprising:
bearing means disposed between the inner race and the means for adjusting the inner race for rotationally supporting the inner race with respect to the housing.

22. An adjustable rotational coupler as in claim 21, wherein the bearing means comprises a tapered roller bearing.

23. An adjustable rotational coupler as in claim 21, further comprising:
a locating ring mounted between the bearing means and the means for adjusting the inner race, the bearing means being inserted into the locating ring and the means for adjusting the inner race engages an outer surface of the locating ring.

24. An adjustable rotational coupler as in claim 19, further comprising:
a gland nut engageable with the housing and the inner race to prevent lateral displacement of the inner race with respect to the housing.

25. An adjustable rotational coupler as in claim 24, further comprising:
bearing means disposed between the inner race and the gland nut for rotationally supporting the inner race with respect to the gland nut.

26. An adjustable rotational coupler as in claim 25, wherein the bearing means comprises a thrust bearing.

27. An adjustable rotational coupler as in claim 19, further comprising:
sealing means for sealing the coupler to retain a lubricant in the interior of the coupler.

28. In combination with a torque converter welding machine comprising a fixed shaft, a chuck mounted to the fixed shaft and a telescoping shaft which can be telescoped toward the chuck, an adjustable rotational coupler comprising:
a housing having an interior bore concentric with a central axis of the housing, the housing mountable to the telescoping shaft;
a rotatable inner race adjustably disposed in the interior bore of the housing;
a face plate attached to the inner race;
means for angularly adjusting the face plate with respect to the chuck such that an attitude of a plane perpendicular to the central axis of the face plate is adjustable with respect to an attitude of a plane perpendicular to a central axis of the chuck; and
means for transversely adjusting the face plate with respect to the chuck such that a central axis of the face plate is transversely adjustable with respect to the central axis of the chuck.

29. An adjustable rotational coupler as in claim 28, wherein the means for angularly adjusting the face plate with respect to the chuck comprises:
a plurality of threaded bores disposed in a base of the housing circumferentially parallel to the central axis of the housing; and
a plurality of threaded planar adjusters engaging the threaded bores, respectively, whereby the threaded adjusters can be rotated to engage an end face of the telescoping shaft to thereby displace the housing and face plate with respect to the chuck.

30. An adjustable rotational coupler as in claim 28, wherein the means for transversely adjusting the face plate with respect to the chuck comprises:
a plurality of threaded bores disposed in an outer wall of the housing circumferentially perpendicular to the central axis of the housing; and
a plurality of threaded axial adjusters engaging the threaded bores, respectively, whereby the threaded adjusters can be rotated to displace the inner race and the central axis of the face plate with respect to the chuck.

31. An adjustable rotational coupler as in claim 28, further comprising:
bearing means disposed between the inner race and the means for transversely adjusting the face plate for rotationally supporting the inner race and face plate with respect to the housing.

32. An adjustable rotational coupler as in claim 31, wherein the bearing means comprises a tapered roller bearing.

33. An adjustable rotational coupler as in claim 31, further comprising:
a locating ring mounted between the bearing means and the means for transversely adjusting the face plate, the bearing means being inserted into the locating ring and the means for transversely adjusting the face plate engaging an outer surface of the locating ring.

34. An adjustable rotational coupler as in claim 28, further comprising:
a gland nut engageable with the housing and the inner race to prevent lateral displacement of the inner race with respect to the housing.

35. An adjustable rotational coupler as in claim 34, further comprising:

bearing means disposed between the inner race and the gland nut for rotationally supporting the inner race with respect to the gland nut.

36. An adjustable rotational coupler as in claim 35, wherein the bearing means comprises a thrust bearing.

37. An adjustable rotational coupler as in claim 28, further comprising:
   sealing means for sealing the coupler to retain a lubricant in the interior of the coupler.

38. An adjustable rotational coupler as in claim 1, further comprising:
   means for transversely adjusting the central axis of the housing with respect to the central axis of the mounting member.

39. An adjustable rotational coupler as in claim 38, wherein the means for transversely adjusting the central axis of the housing comprises:
   a boss attached to the housing which is engageable with a bore in the mounting member, the boss having an outer diameter less than an inner diameter of the mounting member bore such that the central axis of the housing can be transversely displaced with respect to the central axis of the bore by up to the difference in the two diameters.

40. An adjustable rotational coupler as in claim 38, wherein the means for transversely adjusting the central axis of the housing comprises:
   a flange attached to the housing which is engageable with an exterior of the mounting member, the flange having an inner bore diameter greater than an outer diameter of the mounting member such that the central axis of the housing can be transversely displaced with respect to the central axis of the bore by up to the difference in the two diameters.

41. An adjustable rotational coupler as in claim 39, further comprising:
   a bushing having an offset internal bore, an exterior of the bushing engageable with the mounting member bore, the offset internal bore engageable with the boss for transversely adjusting the central axis of the housing with respect to the central axis of the mounting member.

42. An adjustable rotational coupler as in claim 39, further comprising:
   a plurality of threaded bores disposed in the mounting member circumferentially perpendicular to the central axis of the mounting member and intersecting the mounting member bore;
   a plurality of threaded axial adjusters engaging the threaded bores, respectively, an end of each adjuster engaging the boss, whereby the threaded adjusters can be rotated to displace the central axis of the housing with respect to the central axis of the mounting member.

43. An adjustable rotational coupler as in claim 40, further comprising:
   a bushing having an offset internal bore, an exterior of the bushing engageable with the flange inner bore, the offset internal bore engageable with the mounting member for transversely adjusting the central axis of the housing with respect to the central axis of the mounting member.

44. An adjustable rotational coupler as in claim 40, further comprising:
   a plurality of threaded bored disposed in the flange circumferentially perpendicular to the central axis of the housing;
   a plurality of threaded axial adjusters engaging the threaded bores respectively, an end of each adjuster engaging the mounting member, whereby the threaded adjusters can be rotated to displace the central axis of the housing with respect to the central axis of the mounting member.

45. An adjustable rotational coupler as in claim 11, further comprising:
   means for transversely adjusting the central axis of the housing with respect to the central axis of the mounting member.

46. An adjustable rotational coupler as in claim 45, wherein the means for transversely adjusting the central axis of the housing comprises:
   a boss attached to the housing which is engageable with a bore in the mounting member, the boss having an outer diameter less than an inner diameter of the mounting member bore such that the central axis of the housing can be transversely displaced with respect to the central axis of the bore by up to the difference in the two diameters.

47. An adjustable rotational coupler as in claim 45, wherein the means for transversely adjusting the central axis of the housing comprises:
   a flange attached to the housing which is engageable with an exterior of the mounting member, the flange having an inner bore diameter greater than an outer diameter of the mounting member such that the central axis of the housing can be transversely displaced with respect to the central axis of the bore by up to the difference in the two diameters.

48. An adjustable rotational coupler as in claim 46, further comprising:
   a bushing having an offset internal bore, an exterior of the bushing engageable with the mounting member bore, the offset internal bore engageable with the boss for transversely adjusting the central axis of the housing with respect to the central axis of the mounting member.

49. An adjustable rotational coupler as in claim 46, further comprising:
   a plurality of threaded bores disposed in the mounting member circumferentially perpendicular to the central axis of the mounting member and intersecting the mounting member bore;
   a plurality of threaded axial adjusters engaging the threaded bores, respectively, an end of each adjuster engaging the boss, whereby the threaded adjusters can be rotated to displace the central axis of the housing with respect to the central axis of the mounting member.

50. An adjustable rotational coupler as in claim 47, further comprising:
   a bushing having an offset internal bore, an exterior of the bushing engageable with the flange inner bore, the offset internal bore engageable with the mounting member for transversely adjusting the central axis of the housing with respect to the central axis of the mounting member.

51. An adjustable rotational coupler as in claim 47, further comprising:
   a plurality of threaded bores disposed in the flange circumferentially perpendicular to the central axis of the housing;
   a plurality of threaded axial adjusters engaging the threaded bores respectively, an end of each adjuster engaging the mounting member, whereby the threaded adjusters can be rotated to displace the central axis of the housing with respect to the central axis of the mounting member.

52. An adjustable rotational coupler as in claim 19, further comprising:
    means for transversely adjusting the central axis of the housing with respect to the central axis of the mounting member.

53. An adjustable rotational coupler as in claim 52, wherein the means for transversely adjusting the central axis of the housing comprises:
    a boss attached to the housing which is engageable with a bore in the mounting member, the boss having an outer diameter less than an inner diameter of the mounting member bore such that the central axis of the housing can be transversely displaced with respect to the central axis of the bore by up to the difference in the two diameters.

54. An adjustable rotational coupler as in claim 52, wherein the means for transversely adjusting the central axis of the housing comprises:
    a flange attached to the housing which is engageable with an exterior of the mounting member, the flange having an inner bore diameter greater than an outer diameter of the mounting member such that the central axis of the housing can be transversely displaced with respect to the central axis of the bore by up to the difference in the two diameters.

55. An adjustable rotational coupler as in claim 53, further comprising:
    a bushing having an offset internal bore, an exterior of the bushing engageable with the mounting member bore, the offset internal bore engageable with the boss for transversely adjusting the central axis of the housing with respect to the central axis of the mounting member.

56. An adjustable rotational coupler as in claim 53, further comprising:
    a plurality of threaded bores disposed in the mounting member circumferentially perpendicular to the central axis of the mounting member and intersecting the mounting member bore;
    a plurality of threaded axial adjusters engaging the threaded bores, respectively, an end of each adjuster engaging the boss, whereby the threaded adjusters can be rotated to displace the central axis of the housing with respect to the central axis of the mounting member.

57. An adjustable rotational coupler as in claim 54, further comprising:
    a bushing having an offset internal bore, an exterior of the bushing engageable with the flange inner bore, the offset internal bore engageable with the mounting member for transversely adjusting the central axis of the housing with respect to the central axis of the mounting member.

58. An adjustable rotational coupler as in claim 54, further comprising:
    a plurality of threaded bores disposed in the flange circumferentially perpendicular to the central axis of the housing;
    a plurality of threaded axial adjusters engaging the threaded bores respectively, an end of each adjuster engaging the mounting member, whereby the threaded adjusters can be rotated to displace the central axis of the housing with respect to the central axis of the mounting member.

59. A combination as in claim 28, further comprising:
    means for transversely adjusting the central axis of the housing with respect to the central axis of the mounting member.

60. A combination as in claim 59, wherein the means for transversely adjusting the central axis of the housing comprises:
    a boss attached to the housing which is engageable with a bore in the mounting member, the boss having an outer diameter less than an inner diameter of the mounting member bore such that the central axis of the housing can be transversely displaced with respect to the central axis of the bore by up to the difference in the two diameters.

61. A combination as in claim 59, wherein the means for transversely adjusting the central axis of the housing comprises:
    a flange attached to the housing which is engageable with an exterior of the mounting member, the flange having an inner bore diameter greater than an outer diameter of the mounting member such that the central axis of the housing can be transversely displaced with respect to the central axis of the bore by up to the difference in the two diameters.

62. A combination as in claim 60, further comprising:
    a bushing having an offset internal bore, an exterior of the bushing engageable with the mounting member bore, the offset internal bore engageable with the boss for transversely adjusting the central axis of the housing with respect to the central axis of the mounting member.

63. A combination as in claim 60, further comprising:
    a plurality of threaded bores disposed in the mounting member circumferentially perpendicular to the central axis of the mounting member and intersecting the mounting member bore;
    a plurality of threaded axial adjusters engaging the threaded bores, respectively, an end of each adjuster engaging the boss, whereby the threaded adjusters can be rotated to displace the central axis of the housing with respect to the central axis of the mounting member.

64. A combination as in claim 61, further comprising:
    a bushing having an offset internal bore, an exterior of the bushing engageable with the flange inner bore, the offset internal bore engageable with the mounting member for transversely adjusting the central axis of the housing with respect to the central axis of the mounting member.

65. A combination as in claim 61, further comprising:
    a plurality of threaded bores disposed in the flange circumferentially perpendicular to the central axis of the housing;
    a plurality of threaded axial adjusters engaging the threaded bores respectively, an end of each adjuster engaging the mounting member, whereby the threaded adjusters can be rotated to displace the central axis of the housing with respect to the central axis of the mounting member.

* * * * *